Figure 1:
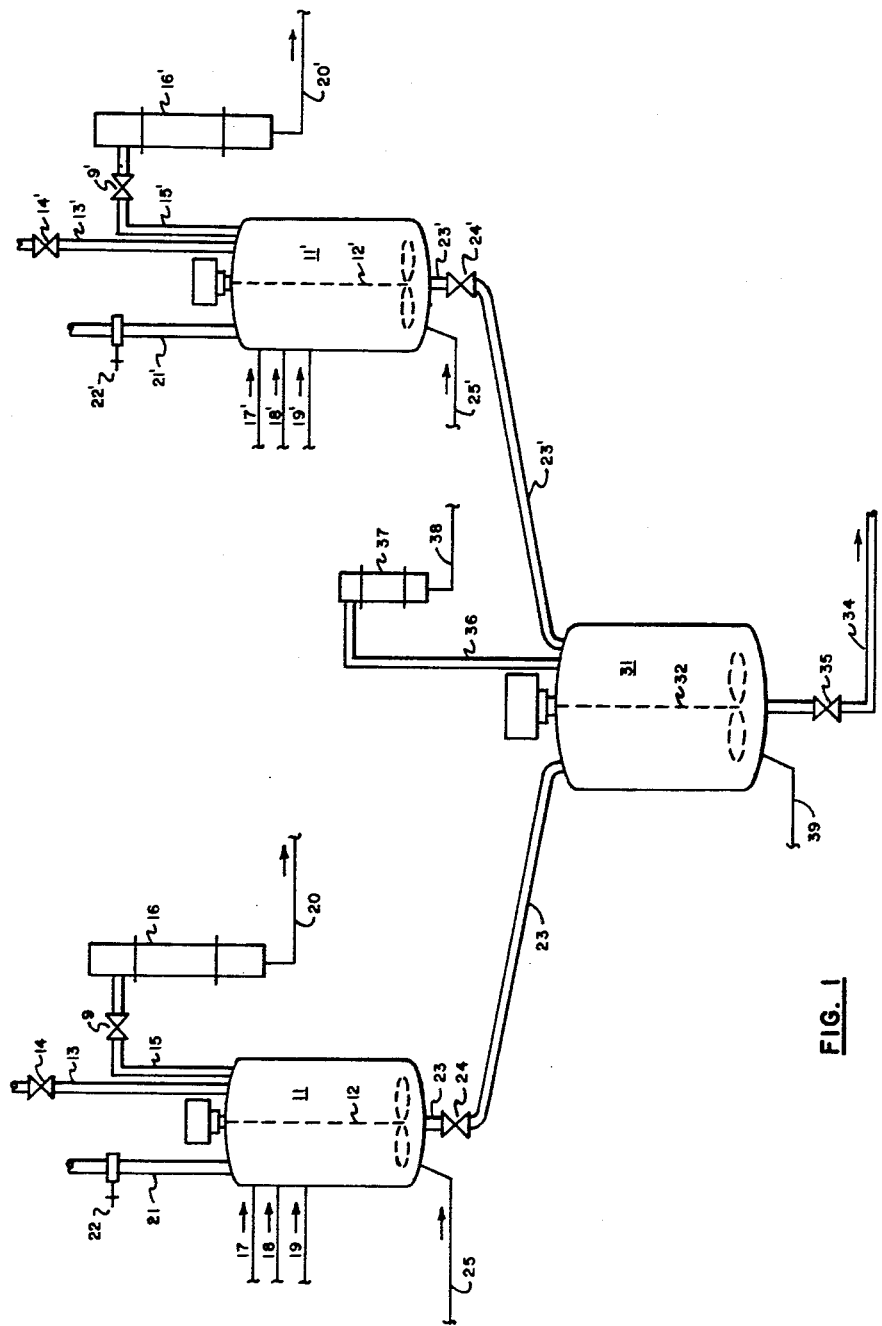

Aug. 4, 1964  E. L. CROXTON ETAL  3,143,481
RECOVERY OF ALKYLLEAD COMPOUNDS
Filed Oct. 22, 1963

United States Patent Office 3,143,481
Patented Aug. 4, 1964

3,143,481
RECOVERY OF ALKYLLEAD COMPOUNDS
Eugene L. Croxton, Baton Rouge, La., and Donald E. Park, Orangeburg, S.C., assignors to Ethyl Corporation, New York, N.Y., a corporation of Virginia
Filed Oct. 22, 1963, Ser. No. 317,926
5 Claims. (Cl. 202—46)

INTRODUCTION

This invention relates to the manufacture and recovery of tetraalkyllead compounds, such as tetraethyllead and tetra-n-propyllead. More particularly, the invention relates to a new and improved process for the recovery of these products from a mixture, termed "reaction mass," which is the mixture, or most of the mixture, of reaction components after the completion of a synthesis reaction.

PRIOR ART AND PROBLEMS

Tetraalkyllead compounds have long been known as effective antiknock materials. Tetraethyllead, a particularly important compound, finds wide usage as antiknock component for fuels for gasoline engines. The tetraalkyllead compounds can be made by various synthesis reaction known in the art. The most important type of reaction involves reacting an alkali metal lead alloy with an alkyl halide. Thus, in the case of tetraethyllead, the most common reaction is

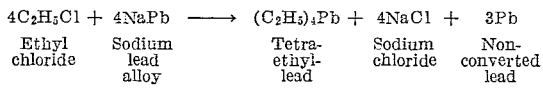

| $4C_2H_5Cl$ | $+$ | $4NaPb$ | $\longrightarrow$ | $(C_2H_5)_4Pb$ | $+$ | $4NaCl$ | $+$ | $3Pb$ |
|---|---|---|---|---|---|---|---|---|
| Ethyl chloride | | Sodium lead alloy | | Tetra-ethyl-lead | | Sodium chloride | | Non-converted lead |

From the foregoing, it is seen that the above process, even if perfect stoichiometric yield were obtained, results in the release of three equivalents of lead for every mole of tetraethyllead produced. In addition to the lead, the reaction product mixture, or "reaction mass" contains substantial quantities of sodium chloride, and also minor quantities of various impurities as lead salts, lead oxide, as well as small amounts of ethyl chloride.

In the other reactions available in the art for the synthesis of alkyllead compounds, the reaction masses produced also almost invariably contain substantial quantities of an inorganic metal salt and non-converted lead metal in finely subdivided form. Such alternative reactions will be exhibited more fully hereinafter. In all cases, then, an efficient method of separation of the tetraalkyllead from the reaction mass, no matter how produced, is necessary. Also, the non-converted lead metal must be isolated and made available for recycle for an efficient process.

The favorite method of recovery involves a steam distillation operation. In carrying out such an operation, the description hereafter being exemplified by reference to tetraethyllead reaction masses, the reaction mass is discharged from the synthesis reactor, or autoclave, and is dropped into a supply of water in a distillation vessel, hereafter referred to as a still. The resulting system is vigorously agitated and steam is passed therethrough. A steam distillation occurs, the steam and vaporized tetraethyllead being passed overhead, and thereafter into condensers for condensation of these vapors. As the liquefied tetraethyllead is immiscible with, and is more dense than, water, prompt stratification occurs, and a concentrated, reasonably pure layer of tetraethyllead is thereby isolated. The steam distillation operation described is quite effective. High recoveries of the tetraethyllead are entirely possible.

Certain ancillary difficulties have been encountered in the past, but these have been remedied to some extent. For example, the highly subdivided excess lead provides a high surface solids system, which solids tend to agglomerate under the agitation. The addition of various additives, such as are disclosed in Patents 2,513,654 and 2,513,659, have been found to clearly reduce the difficulties with agglomeration. One severely limiting factor with respect to the steam distillation has been the fairly lengthly time and copious quantities of steam required. The duration of steam distillation has therefore imposed a significant production limitation on any given plant operation, and large segments of equipment, particularly the autoclaves in which the tetraalkylead is synthesized, are idle during a portion of the operation time for a given batch.

OBJECTS

An object of the present invention is, basically, to provide a new and highly improved steam distillation operation for the recovery of tetraalkyllead compounds from reaction mass. An additional object is to provide a novel steam distillation recovery process of greater capacity, relative to the synthesis operations of a plant, than has heretofore been available. An additional object of certain embodiments is to provide a steam distillation recovery process wherein more efficient use of steam is realizable. Other objects will appear hereinafter.

FIGURES

Figure 2:
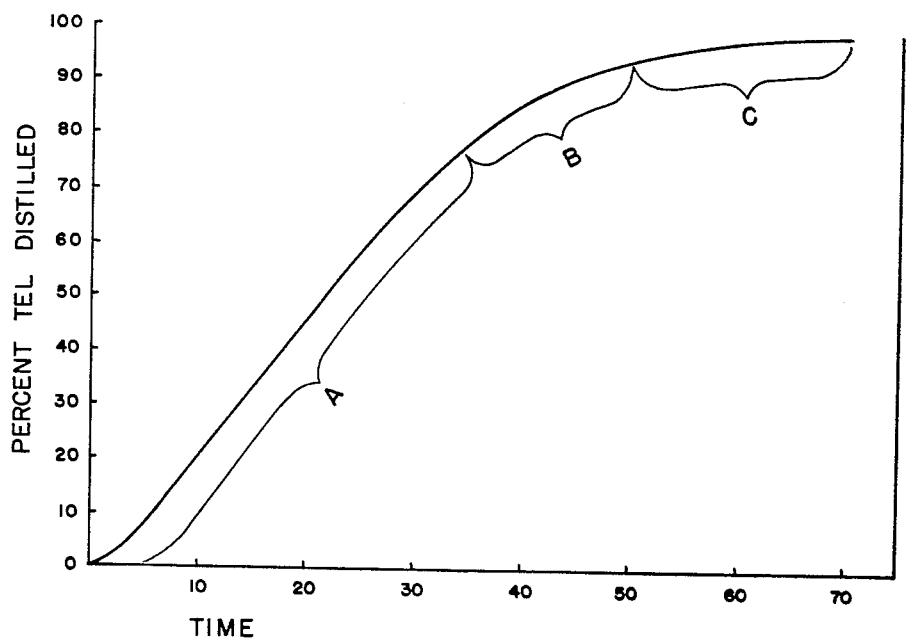
Figure 3:
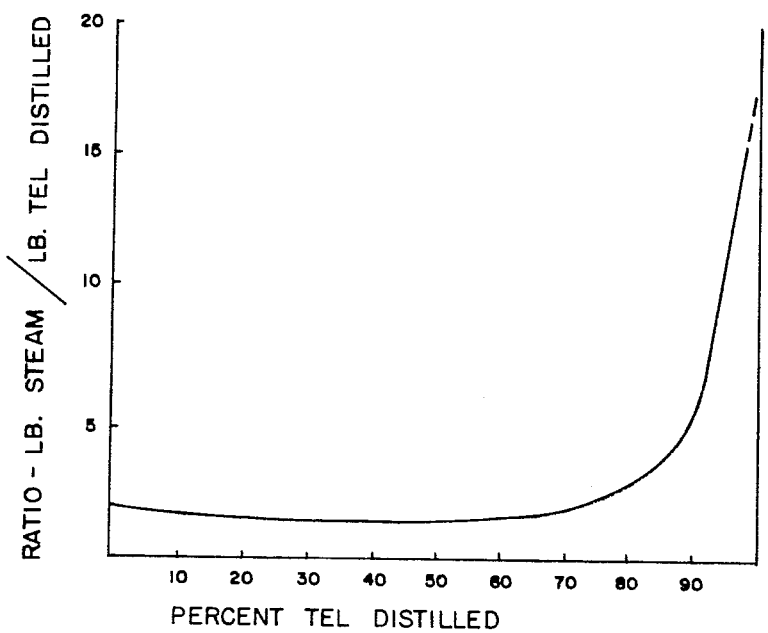

The details of the present invention and of the best mode of operation will be readily understood from the description and working examples given hereinafter, and by reference to the accompanying figures, wherein:

FIG. 1 is a schematic representation of typical apparatus employed in conducting the process of the invention, FIG. 2 is a graphical representation of the percentage of tetraethyllead distilled from reaction mass, as it varies with time at a constant steam rate, and FIG. 3 is a graphical representation of the effectiveness of distillation illustrating graphically the type of improvement which is realizable according to the present process.

The process of the present invention is applicable to and intended for recovery from batch reaction masses characterized by being superficially dry, or semi-dry, viz., having high proportions of finely divided lead solids present of high surface characteristics as is realized by an alkylation process wherein the lead is originally present in the form of an alkali metal lead alloy. The information given graphically by FIGURES 2 and 3 is specific to the materials, including specifically tetraethyllead, references thereto, and the other conditions enumerated. However, corresponding relationships exist for the other tetraalkyllead compounds and for similar reaction masses characterized by high lead solids contents.

DESCRIPTION

The present invention is, then, an improvement in the steam distillation recovery of tetraalkyllead compounds from batch reaction masses having substantial proportions of subdivided lead. The improvement comprises steam distilling over one-half of the tetraalkyllead in a first steam distillation at a high steam rate of 0.015 to 0.05 pound of steam per minute per pound of the lead present, then transferring the residue from the first or primary steam distillation to a second steam distillation zone and steam distilling at a steam rate of 0.0075 to 0.05 pound of steam per minute. The second steam distillation is continued until total recovery is at least about 95 percent of the tetraalkyllead originally present in the reaction mass.

In the preferred embodiments of the invention, the first steam distillation is continued until from about two-thirds to nineteen-twentieths of the tetraalkyllead is distilled, and the second steam distillation is carried out until the total recovery is at least about 97 percent. In more preferred embodiments, the steam rate of the first distillation is 0.02 to 0.04 pound per minute per pound of lead, while the steam rate in the second distillation is 0.0075 to 0.03 and, for maximum economy, is below the rate in the first distillation. The most preferred range in the second distillation is 0.01 to 0.017.

The residence time in each distillation zone is usually approximately the same, but need not be, and is effected by the geometric configuration of the stills, which to some extent affects the maximum throughput velocities.

In carrying out the process, the reaction mass is charged to a first steam still, along with water and appropriate antiagglomerants or other additives, and is then steam distilled while agitating. This distillation is usually carried out at approximately one atmosphere, but pressures of up to 5 to 10 lbs. per sq. in. are occasionally advantageous. The first or primary distillation is characterized by a relatively high steam rate, and during most of this primary distillation, a substantially constant and high ratio of the tetraalkyllead to steam. After the indicated proportion of the available tetraalkyllead (i.e., the total tetraalkyllead content of the original reaction mass charged) has been steam distilled, the ratio of the tetraalkyllead to the effluent stream begins to decrease, and, in fact, decreases at an increasing rate for a period. This change begins when over one-half, and usually at least two-thirds and before about nineteen-twentieths of the original material has been distilled. The primary distillation is then terminated, and the partly distilled mixture is transferred to a secondary still.

The transfer should be conducted relatively rapidly and means should be provided to prevent the solid, high surface lead particles from agglomerating. The transfer can be implemented by the rapid application of inert gas pressure of the order of 10 to 25 pounds per square inch. The charge transferred, in the case of tetraethyllead, for example, contains the water and any condensed steam, as well as the non-distilled tetraethyllead, the subdivided lead particles originally present, and the sodium chloride in solution in the aqueous phase. In the second steam still, a secondary distillation is effected, but an appreciably lower steam rate is permissive. Thus, the rate of steam relative to the original size of the entire reaction mass can be significantly lower. The rate of steam is desirably expressed in terms of parts of steam per unit time per part of the lead solids of the original reaction mass, as these remain constant during the entire process. This secondary steam distillation is continued until over 90 percent, and preferably at least about 95 percent of the tetraalkyllead originally present is removed. Preferably, the total recovery is at least 97 percent, and, in practice, a total recovery of 98 percent is commonly realized. This recovery is the cumulated recovery from the primary and secondary stills.

The benefits of the invention are obtained in various degree when the primary distillation is as described above, viz., terminated upon distillation of over one-half and preferably at least two-thirds of the tetraalkyllead. For a higher degree of benefit, it is found that the primary distillation is terminated when at least four-fifths and up to about nine-tenths, or approaching nineteen-twentieths of the tetraalkyllead has been distilled. It will be seen that in all forms and embodiments of the process a substantial quantity of the tetraalkyllead product is left in the reaction mass after the primary distillation. Despite the relatively low fraction of this quantity, its recovery in high degree is essential to an efficient process. In the secondary distillation, then, the recovery accomplishes, at the lower steam rate already mentioned, an additional quantity providing the desired total of over 95 percent and preferably at least 97 percent of the total tetraalkyllead.

The primary and secondary stills in an operating plant can be the same in number, i.e. each primary still can be tied into a corresponding secondary still. In preferred embodiments, a plurality of primary stills are provided for each secondary still. Thus, there can be one secondary still for 8 or more primary stills, and down to one for two primary stills, this latter being used in particularly preferred embodiments of the invention. Such embodiments provide particularly efficient utilization of the still space and provide particularly easy control.

As already stated the primary distillation, or distillations (when a plurality of parallel primary stills are manifolded to a secondary still) is conducted at a high steam rate. In the case of recovering tetraethyllead from a monosodium-lead alloy reaction mass, the primary distillation is conducted at a rate of from about 0.015 to 0.05 lb. of steam per minute per lb. of lead present. Steam rates even higher than this range are permissible, but ancillary problems are then frequently introduced, such as entrainment of some of the finely divided solids present. A more preferred range of steam rates in the primary still is from 0.02 to 0.04, a more highly preferred range being from 0.025 to 0.035 lb. of steam per minute per lb. of lead in the reaction mass.

The foregoing ranges, and those cited below are generally applicable to reaction masses of various origins. In embodiments of the invention applied to reaction masses generated from processes different than the monosodium lead alloy-ethyl chloride process, or when a product other than tetraethyllead is recovered, the optimum rates may vary. The precise details of still design can also effect the preferred ranges.

After terminating the primary distillation and transferring the partly distilled material to the secondary still, the secondary distillation is carried out with a steam rate in a range extending appreciably below the rate in the primary range, but as high as the rate in the first stage if desired. A preferred range is from about 0.0075 to 0.03 lb. of steam per minute per lb. of lead solids. A more preferred range is from 0.01 to 0.017 lb. of steam per minute per lb. of lead.

It will be noted that broadest ranges of steam flow expressed above, for the secondary distillation, overlap the range for the primary distillation, but that the range extends to much lower levels. The maximum rates are determined primarly, or at least in part, by the physical characteristics of the solids in the reaction mass, i.e., the rate at which entrainment becomes a problem. The maximum rate is not necessarily the most effective, however, particularly in the secondary distillation. Hence, although the rate in the secondary still may be the same as employed in the primary still, the maximum benefits are achieved when the secondary steam rate is below the steam rates utilized in the primary still. In other words, although the steam rate in the secondary still can approach or even exceed the primary rate, in a specific embodiment, the benefits of the process are then curtailed with respect to the integrated or overall steam efficiency of the process.

A schematic apparatus arrangement, and illustration of apparatus, for conducting embodiments such as last described above, is illustrated in FIG. 1. It will be understood that the process is not limited to utilizing any single or particular style of apparatus units or vessels, and that considerable flexibility is available within the scope of the principles of the invention, as will be clear from the further description hereinafter. FIG. 1, however, does illustrate a typical and preferred arrangement wherein two primary stills are mated or combined with a single secondary still.

Referring to FIG. 1, the two primary stills 11, 11' are shown and one secondary still 31. In the description hereinafter, it will be understood that the configuration of both of the primary stills 11, 11' is usually identical. The stills are steel vessels of circular cross section, provided with an agitator assembly 12, 12', for agitation of the heterogenous system processed by the distillation. The feed to each primary still is provided by a charging line 21, 21' and the reaction mass is admitted thereto by opening of the valve 22, 22' as required. A vent line 13, 13' provided with a vent valve 14, 14', leads from the primary still 11, 11' for venting of high volatile components, particularly ethyl chloride, which can be present in small amounts at the beginning of an operation. A product vapor line 15, 15' leads from each primary still to a condenser 16, 16' which condenses the vaporized tetraethyllead and accompanying steam and discharges the condensate through a condensate line 20, 20'.

One or more supplemental feed nozzles or lines 17, 18, 19, 17', 18', and 19' are provided to allow feed to the primary still of additives or surface active agents which can be employed in necessary small concentration to perform the indicated functions. In addition, provision is made for feeding an inert gas in one of said supplemental feed lines. Steam is supplied to the primary still through a steam line 25, 25', which usually has a multiplicity of outlets spaced around the body of the still. Alternatively, an internal distribution outlet is employed. A discharge line 23, 23' is provided at the bottom of the primary still, and is fitted with a discharge valve 24, 24'.

The secondary still 31 resembles in general configuration the primary stills, and is provided with an agitator assembly 32. A vaporized product line 36 from the top of the still, to a condenser 37, provides for transmittal and condensation of vaporized tetraethyllead and steam, the condensate being transmitted through a condensate line 38. The condensate is collected in receiving vessels, not shown, and stratified into a tetraalkyllead layer and the aqueous layer. Steam is admitted to the secondary still 31 through a steam line 39, feeding to the interior of the still body and distributing the steam as desired. A discharge line 34, having a discharge valve 35, is provided for discharge of the distilled contents to supplemental water removal or drying operations, and ultimate recovery of the lead solids in said mixture.

Before illustrating the process and the various embodiments thereof by particular working examples, the graphical representations of FIG. 2 and FIG. 3 will aid in understanding the benefits of the invention. Referring to FIG. 2, this shows the percent of tetraethyllead distilled as a function of time. This graphical relation represents the composite of a substantial number of commercial scale operations. It will be noted that the curve includes three segments, A, B, and C. The initial segment A shows that for an extended period, the rate of removal of the tetraethyllead from the reaction mass is a constant. In other words, a relatively high rate of removal of the tetraethyllead, in direct proportion to the quantity of steam supplied, is achieved.

As the amount of tetraethyllead distilled exceeds one-half, and approaches about 75 percent, the rate of tetraethyllead distilled begins to decrease, as indicated by segment B. Expressed alternatively, in this portion of an operation, the steam passed through and discharged is accompanied by a steadily decreasing proportion of tetraethyllead. At the termination of this portion of the distillation, as shown by segment B, a large fraction of the tetraethyllead has been removed, of about 85 to slightly over 90 percent, on the average. It will be realized that, in a large number of operations, the precise numerical values associated with these segments, will be variable, but are in the general range given. Continuation of the distillation after segment B is represented by the portion C of the distillation curve, during which the rate of distillation of the tetraethyllead is again a substantially constant value, up until the time that the distillation is terminated with a total recovery of 98–99 percent of the tetraethyllead originally present in the reaction mass. However, as clear from segment C during this portion of the operation the quantity of tetraethyllead removed is again at a substantially constant, but relatively low rate, either considered in terms of pounds per unit time, or in proportion to the quantity of steam fed through the steam still.

The curve of FIG. 2 represents the performance of a conventional distillation at a uniform steam rate, of the order of about 0.018 to 0.020 lb. per minute per lb. of the lead. When higher or lower steam rates are employed, the corresponding curve of tetraethyllead distillations will exhibit a similar configuration, but the slope thereof, as a time function, will vary, particularly in the segment A of the curve. On the other hand the configuration of segments B and C will remain substantially the same.

From FIG. 2, described above, it is seen that the steam, supplied at a constant rate through the entire operation, which may be a distillation period of one to two hours, is utilized at low efficiency during about 50 percent of the distillation cycle.

The weakness of the prior distillation operations, and the benefits of the present improved operation, is further illustrated by FIG. 3. FIG. 3 shows the steam consumption expressed in terms of pounds of steam per pound of tetraethyllead distilled, as it varies during a distillation cycle. It is seen that with distillation of up to about 70–75 percent of the available tetraethyllead, that the steam is utilized in the proportions of roughly 1.8–2.1 pounds per pound of tetraethyllead. This range of operation corresponds generally to segment A of FIG. 2. Above this distillation level, the consumption of steam rapidly rises, and during the distillation of the last 9 or 10 percent of the tetraethyllead distilled, the steam consumption is at the inordinately high proportion of from 5 to approaching 18–20 pounds per pound of the tetraethyllead. From the foregoing, it is seen that not only is a large proportion of the total distillation time required for the recovery of a relatively small segment, as illustrated by FIG. 2, but in addition, heretofore, a large fraction of the steam required, of the order of 40 to 65 percent, has been in this connection.

It is surprising that, heretofore, the steam distillations have invariably exhibited the above mentioned inefficient performance during the latter portion of a distillation. In fact, from the theoretical principles of steam distillation of materials immiscible with steam, it would be expected that the tetraethyllead steam ratio would be maintained constant throughout a distillation, or until substantially all of the recoverable tetraethyllead has been distilled. It appears, then, that some peculiar characteristic of the system being processed is responsible for the inefficient performance above described. The present improved process provides results which solve the above described two major problems of the prior methods, viz. lengthy steam distillation periods and poor steam utilization.

The following examples further illustrate some of the various embodiments of the invention.

*Example 1*

This operation illustrates an embodiment of the process specifically directed to the most efficient use of steam, when recovering tetraethyllead from a reaction mass derived from the reaction of monosodium lead alloy, NaPb, and ethyl chloride, and utilizes the type of apparatus comprising a combination of two primary stills and one secondary still, illustrated by FIG. 1.

Two separate batch ethylations of subdivided sodium lead alloy are carried out in two separate autoclaves, each employing a charge of 3,000 pounds of sodium lead alloy. Upon completion of the reaction, after venting in the usual manner, the autoclave contains a reaction mass such as previously mentioned which consists of about 23 percent tetraethyllead, about 54 percent subdivided lead metal (including a small proportion of the lead still chemically combined with sodium) and about 20 percent sodium chloride. In addition, a small amount of ethyl chloride is present in the reaction mass, upon completion of the autoclave reaction cycle.

The contents of the two autoclaves are then discharged through charging lines 21, 21', to the primary stills 11, 11', the stills having been already charged with water, fed through line 17, in proportions of about 5 to 7 gallons per 100 pounds of reaction mass. Various additives or anti-agglomerants are also added at this time. The charge of the reaction mass to the still is made while the agitator 12, 12' is running, and this agitation is kept up through the steam distillation operation including the discharge of the still contents. Immediately following the charging, the charging valve 22, 22', in the charging line 21, 21' of each still, is closed and steam is admitted to the still body through the steam feed lines, 25, 25'. As already mentioned, a plurality of jets, not shown, actually admit the steam to the exterior of the still body.

For a several minute period, the minimal amount of ethyl chloride already mentioned is vaporized, as the steam being fed condenses in the aqueous phase and raises the temperature of the mixture. This ethyl chloride is discharged from the still through the vent line 13, 13' and is recovered at a separate point. The vent line valve 14, 14' is then closed and the vapors from the still pass through the overhead line 15, 15' to product condensers 16, 16'.

The steam rate applied to each primary still is about 0.019 pound per minute per pound of the lead content in still. By lead content is meant the lead metal, in sub-divided form, referred to above in giving the composition of the reaction mass. The steam is continued to the still for a period of approximately 35 minutes or slightly longer, which results in the distillation of approximately 90 percent of the tetraethyllead originally present in the reaction mass. The tetraethyllead, plus the steam accompanying it in the vapor phase, is condensed in the condenser 16, 16' and discharged through the contact line 20, 20' to appropriate stratification equipment for the isolation of a concentrated, substantially pure tetraethyllead phase. The total steam consumption for these two primary distillations is about 2800 pounds. The steam feed is then discontinued and the valve 9, 9' in the vapor line 15, 15' from each still is closed. A nitrogen pressure is then built up in the still chamber 11, 11' by feeding in nitrogen through line 18, the nitrogen pressure being built up to approximately 20 pounds per square inch gauge. After attainment of the indicated nitrogen pressure, then discharge valve 24, 24' in each discharge line, 23, 23' is rapidly opened. By this is meant to the extent that instantaneous opening can be provided, this is done. Under the influence of the reservoir of nitrogen pressure referred to above, and of gravity flow, the heterogenous solid liquid system in the still rapidly discharges through the discharge line 23 to the secondary still body 31. The secondary still is not previously charged with water, but the agitator assembly 32 is operated during this charging operation, and the final discharge valve 35 is closed. Upon complete transfer of the distillation mixture to the secondary still 31, valves 24, 24' are closed and steam is passed through the steam feed line 39. The steam rate at this point is appreciably less than the rate during the primary distillation, being at the rate of about 0.01 pound per pound of lead per minute, and is continued for a period of about 25–30 minutes, until a total steam consumption in this step of about 1000–1050 pounds steam has been experienced. This secondary distillation step provides an additional recovery of a large segment of the remaining tetraethyllead, the cumulated recovery being 98–99 percent.

The total amount of steam consumed in the above primary and secondary distillations is of the order of 3800–3900 pounds. By way of contrast, when the distillation of these two batches of reaction mass is carried out in a single stage, using the steam rate of 0.019 pound per minute per pound of lead, a total steam consumption of about 4800 pounds has heretofore been experienced. Hence, the operation according to this example results in a steam savings of about 20 percent. In addition, it will be seen that the time of distillation in the primary stills, instead of being over one hour, as in the former operation, is reduced to below 40 minutes by the improved method, as the distillation is split between the two separate distillation zones, viz., the primary still and the secondary still. A pronounced benefit is thus realized in that the availability of the primary stills is thus increased, and there is less need for rigorous scheduling to correspond to the cyclic operation of the preceding autoclaves which synthesize the reaction masses charged to the stills.

Greater economies of steam and of time are possible according to the present process as illustrated by the following example. The benefits illustrated arise from the fact that it has been discovered that the primary distillation operation, under the present process, is susceptible, within limits, to increases in steam rate without any marked deterioration in efficiency. On the other hand, the distillation carried out in the secondary stills employed in the present process is not susceptible to particular improvement by high steam rates, and in most cases it is advantageous to employ a very low steam rate of the order of, preferably 0.010 to 0.017 lb. of steam per minute per lb. of the lead solids in the system being treated. High steam rates are entirely feasible in the secondary distillation, and high recoveries will be achieved. In such embodiments, however, the primary benefit of the invention is the more efficient time utilization of the available still space. It has been discovered that the unusual characteristics of the materials being processed establish different limiting factors on effective distillation dependent upon the portion of an overall steam distillation cycle which is being carried out. Instead of employing high rates of steam throughout the cycle, as has been the universal practice heretofore, the present process normally curtails the steam rate during the secondary distillation. In certain embodiments, the steam rate in the secondary distillation is curtailed to the lowest rate at which the steam rate has no significant effect on the amount of tetraethyllead distilled, that is, as low as about 0.0075 pound per minute per pound of the lead solids. It will be understood that this lower minimum is effected to some extent by the design of the steam still. A non-insulated still, or one with a high surface to volume ratio, will dissipate more heat to the atmosphere and the permissible low steam rate will be somewhat higher. In general, however, an actual, secondary, steam rate of from about 0.01 to 0.017 pound steam per minute per pound of lead is most effective in achieving the objects of the invention.

The following example illustrates a further variation, wherein the same conditions as employed in Example 1 are employed in the first distillation, but this segment of the process is terminated at an earlier point.

*Example 2*

The same general procedure is followed as in Example 1, except that the primary distillation is continued for only about 22–23 minutes, at which time the total steam consumption is of the order of 1700 pounds of steam, total, in both primary stills, and about 60 percent of the tetraethyllead has been recovered.

The partially distilled reaction masses are then discharged to the secondary still, and steam feed is continued at the same rate of 0.019 pound per minutes per pound of lead, until the additional tetraethyllead distilled provides accumulated recovery of about 90 percent. The steam rate is then curtailed to the lower level of 0.014 pound per minute per pound of lead, and continued for an additional 23 minutes, whereby a total recovery of about 98 percent or over is achieved. The total steam consumption in this stage is about 2800 lbs., bringing the total for the process to about 4450–4500 lbs., or about seven precent below the normal consumption.

The following example illustrates an operation in which a higher steam rate is employed, and the primary distillation is terminated at an early point, viz., when only about 70 percent of the tetraethyllead has been distilled, and the secondary distillation rate is quite low.

*Example 3*

The same general procedure is followed as in Example 1, except that the steam rate in the primary distillation operation is increased to about 0.0227–0.023 pound of steam per minute per pound of lead. The distillation is continued for about 23 minutes, at which time the total steam consumption is of the order of 2200 pounds of steam, total, in both primary stills. The partially distilled mixture is discharged from both stills, following the procedure of Example 1, to the secondary still 31, and is distilled in the same manner as in Example 1, for a period of about 45–50 minutes, and at the low steam rate of 0.0078 pound per minute per pound of lead. The steam consumption in this stage is about 1600–1650 pounds of steam, a total steam consumption being about 3800 pounds for both charges, and again accomplishing a recovery of the order of 97–98 percent of the tetraethyllead originally present.

To illustrate the profound economies according to the above example, when the same type and size of reaction mass charges are distilled in one stage only, and employing a steam rate corresponding to the steam rate in the primary distillation in the above example, the total steam consumption is of the order of 4900 pounds for the two reaction mass charges. Hence, the present example permits a saving of about 20–22 percent of the steam heretofore used. Of equal significance is the reduction of hold-up time in the first still to less than one-half hour.

The following example shows a similar operation in which the primary steam rate is even higher, over 50 percent greater than in Example 1, and in which primary distillation is continued until 91 percent of the original tetraethyllead is distilled.

*Example 4*

The same apparatus as employed in the foregoing examples is again used, and the ethylation procedure is the same. The primary distillation in the primary stills 11, 11' is carried out with a steam rate, to each still, of about 0.0316 pound per minute per pound of the lead content. After distillation of about 91 percent of the tetraethyllead from each primary distillation zone, through the overhead lines 15, 15', the still or charges are ready for transfer to the secondary still 31. Instead of pressurizing the primary stills with nitrogen pressure, as in the preceding operations, the transfer is accomplished by providing a jet of water to the inside of the stills, and directed to the opening therefrom into the transfer lines 23, 23'. A relatively small quantity of water is employed, and this is provided only during the final portion of the transfer.

Upon full transfer of the two still charges to the secondary still 31, the secondary distillation is carried out with a steam rate of about 0.011 pound per minute per pound of the lead present.

The steam consumption in the two operations is about 2700 pounds in the primary distillation and about 970 pounds in the secondary distillation, or a total of about 3700 pounds.

According to prior methods, carrying out the entire distillation in a single still body, about 5500–5600 pounds of steam were required, or utilized, so that the present improved operation results in a reduction of the steam load to only about 70 percent of that previously required. In addition, the time required for the primary distillation, for processing the charges, is reduced to about one-half of the time previously required.

As previously mentioned numerous other apparatus variations are available in addition to the apparatus shown in FIG. 1, used in the foregoing examples. Accordingly, when the operations of Examples 1 to 3, inc., are repeated, except that eight primary stills are used for each secondary still, the same performance results are achieved. Alternatively, when an individual secondary still is used for each primary still, and the same relative steam rates are employed, comparable results are obtained.

As also mentioned heretofore, the principles of the present process are fully applicable to the recovery of tetraethyllead made by different reactions than the ethylation of monosodium lead alloy. Also, the method is fully applicable to recovery of different tetraalkyllead compounds. The common characteristic of the charges of reaction masses is the presence of substantial proportions of subdivided lead particles. The following examples illustrate certain of these variations.

*Example 5*

In this operation, the tetraethyllead is produced by the reaction of an alloy containing about 20 weight percent sodium and lead. In reacting a batch of alloy, approximately 50–55 percent more tetraethyllead is produced than when processing the same amount of monosodium lead alloy. The recovery is carried out in the same manner as in any of Examples 1–4, above, and using the same steam rate conditions. The duration of the primary distillation time is increased by about 50 to 65 percent, over the time used for the corresponding operation, when the reaction mass is produced by the monosodium lead alloy reaction.

While most of the alkyllead synthesis reactions employed involve the reaction of an alkyl halide with a sodium lead alloy only, other processes are available which employ supplemental reactants. These reactions also result in a reaction mass including substantial quantities of finely subdivided lead which has not been converted to the desired tetraalkyllead compound. An illustration of such a reaction is given in the following example.

*Example 6*

In this operation, the reaction follows the procedure described in Patent 2,535,190, the reactor charge including monosodium lead alloy, ethyl chloride, magnesium metal and ether, in concentrations of about 16 and 15 percent, respectively, based on the alloy.

The reaction mass formed after reaction includes tetraethyllead in appreciably higher amounts than in the case of the monosodium lead alloy used in Examples 1–4, inc. In carrying out the two step steam distillation of the present process, the primary distillation is usually longer. Further, the steam rates employed are desirably in the higher portions of the ranges previously stated.

The recovery process of the invention finds most frequent use in the recovery of tetraethyllead, but the process is equally applicable to the recovery of other tetraalkyllead compounds of which the following is a typical example.

*Example 7*

Reactions are carried out with monosodium lead alloy and n-propyl chloride, resulting in a yield of about 70–75 percent tetra-n-propyl lead. The reaction mixtures for reaction masses include about 24 percent of this alkyllead compound, 57 percent subdivided lead and about 20 percent sodium chloride.

The steam distillation of these reaction masses in carried out in the same manner as in the previous examples. Because of the appreciably lower vapor pressure of this tetraalkyllead compound, the ratio of steam to tetra-n-propyllead is increased by a factor of about 4 to 4.5 over that encountered in a primary distillation with tetraethyllead. The time required for primary distillation is, then, increased over the time for an equivalent primary distillation, at the same steam rate, with tetraethyllead. High steam rates, in relation to the lead content of a still, are thus particularly desirable in such instances. Because of the high ratio of steam, and the extended time required, even at high relative steam rates, the benefits of the process are particularly marked, viz., with respect to decreasing steam total consumption, and with respect to most efficient use of still apparatus.

When even higher alkyllead compounds, e.g., tetra-n-butyl lead, are made, the same principles subsist. Also, when tetraalkyllead compounds having dissimilar alkyl groups thereon are made, the process is fully applicable. In making a mixture predominating in dimethyl diethyllead, for example, the same operations can be carried out and comparable benefits are realized.

VARIATIONS

From the foregoing examples, it will be apparent that the present invention is of general applicability in recovering a tetraalkyllead from reaction masses derived from a variety of synthesis reactions.

The preferred embodiments of the recovery process utilize one secondary still for two primary stills, but it will be apparent that the process is not limited to this particular procedure or apparatus configuration. Thus, depending upon various practical factors, it is frequently desirable to employ one secondary still for 8 or even more primary stills. In the opposite direction, if desired, one secondary still for each primary still can be provided.

In substantially all instances the operating pressure is approximately atmospheric, in both the primary and secondary stills. In a few cases, the application of a small amount of pressure during the primary distillation will be advantageous, as it is found that the vapor pressure of tetraethyllead, and other alkyllead compounds which may be recovered, tends to increase greater with increases in the accompanying temperature change, than does the partial pressure of the steam-water phase present. Hence, some degree of enrichment of the vapors leaving the still is accomplished by raising the operating pressure during the primary distillation up to, approximately, 5 pounds or ten pounds gauge pressure. The temperature of operation will usually be in the region of 200–230° F.

Ordinarily, the particular configuration of the steam stills is that of a cylindrical, rounded bottom pot, the height being at least as great, and usually greater than the diameter. Agitation devices are employed, being required because of the relatively high density of the subdivided lead solids, relative to the aqueous phase present. The process is not, however, limited to a particular apparatus configuration. In some instances, the primary still is a relatively tall vessel, relative to the diameter. In such an operation, the reaction mass extends through a relatively deep zone and steam efficiency is slightly improved. Provision should be made, whatever the particular configuration of the primary steam still, for adequate disengagement of the discharging vapors, and the solids which are present in the still vessel. Ordinarily it is preferred that the steam vapor velocity should not be much above 3 lbs. per square foot per minute during the primary distillation, and preferably not over about 2.7 lbs. Even this limitation can be overcome by providing appropriate enlarged cross sectional space above the actual distillation zone to provide the appropriate disengaging by reduction of velocity of the discharging vapors.

The amount of water initially charged to the primary steam still is not critical. Generally, it is found that water sufficient to fully immerse the reaction mass charged is adequate, and this usually amounts to about 5 to 10 gallons per hundred pounds of the reaction mass.

As already illustrated, a variety of approaches or techniques are available to facilitate the discharge of the contents of the primary still to the secondary still. Ordinarily, the transfer line between the two stills can be made of sufficient size and inclination so that the partially distilled contents of the primary still are rapidly moved under the influence of gravity to the secondary still. However, as already indicated and illustrated by the examples, providing a moderate pressure of inert gas above the still contents, before opening the transfer line valve, greatly facilitates the transfer in those cases where the transfer line size or length may be limiting. One benefit derived from this technique and transfer is that the nitrogen or other inert gas is fed to the vapor space above the still contents at ambient temperatures, whereas the still contents proper are at appreciably greater temperatures of the order of about 200–220° F. This difference in temperature is responsible for a secondary and significant benefit in that the temperature of the gas increases during the actual discharging, and owing to the effect of raising the temperature of the gas a maintenance of discharge pressure is realized by the heating up of the gas and its increase in pressure according to the gas laws.

The distillation additives known to the prior art, such as soluble iron salts, are desirably employed, as already shown. Further, frequently a thermal decomposition inhibitor is added.

This application is a continuation in part of our application Serial No. 141,338 filed September 28, 1961, now abandoned.

What is claimed is:

1. In the steam distillation recovery of tetraalkyllead compounds from a batch reaction mass including a substantial proportion of subdivided lead and tetraalkyllead, the improved process comprising steam distilling over one-half of the tetraalkyllead in a first steam distillation at a steam rate of 0.015 to 0.05 pound of steam per minute per pound of lead, then transferring the residue from said first steam distillation to a second steam distillation and steam distilling additional tetraalkyllead at a steam rate of 0.0075 to 0.05 pound of steam per minute per pound of lead until the sum of the tetraalkyllead distilled in the first and second distillations is over about 95 percent of the tetraalkyllead originally present in the reaction mass.

2. The improved method of recovering a tetraalkyllead from a reaction mass consisting essentially of subdivided lead metal, an alkali metal chloride and tetraalkyllead, comprising
   (1) steam distilling a part of the tetraalkyllead in a first steam distillation zone at a steam rate of from about 0.015 to 0.05 pound of steam per minute per pound of lead metal, said steam distillation being continued until at least about two-thirds of the tetraalkyllead originally present has been distilled,
   (2) then transferring the residue from (1) to a second steam distillation zone and distilling additional tetraalkyllead therefrom at a steam rate of from about 0.0075 to 0.03 pound of steam per minute of lead metal, and continuing said second steam distillation until the sum of the tetraalkyllead distilled from (1) and (2) is at least about 95 percent of the tetraalkyllead originally present in the reaction mass.

3. The improved method of recovering a tetraalkyllead from a reaction mass consisting essentially of subdivided lead metal, an alkali metal chloride and tetraalkyllead, comprising
   (1) steam distilling a part of the tetraalkyllead in a first steam distillation zone at a steam rate of from about 0.015 to 0.05 pound of steam per minute per pound of lead metal, said steam distillation being continued until from about two-thirds to about nineteen-twentieths of the tetraalkyllead originally present has been distilled,
   (2) then transferring the residue from (1) to a second steam distillation zone and distilling additional tetraalkyllead therefrom at a lower steam rate than used in (1), said lower steam rate being from about 0.0075 to 0.03 pound of steam per minute per pound of lead metal, and continuing said steam distillation until the sum of the tetraalkyllead distilled from (1) and (2) is at least above 95 percent of the tetraalkyllead originally present in the reaction mass.

4. The improved method of recovering tetraethyllead from a reaction mass consisting essentially of subdivided lead metal, sodium chloride and tetraethyllead, comprising (1) steam distilling a part of the tetraethyllead in a first steam distillation zone at a high steam rate of from about 0.02 to 0.04 pound per minute per pound of the lead metal, continuing said distillation until from about four-fifths to about nine-tenths of the tetraethyllead originally present in the reaction mass is steam distilled, (2) pressurizing the residue in the first steam distillation zone (1) with an inert gas at about 10 to 25 pounds per square inch, and abruptly transferring said residue to a second steam distillation zone by sharply opening a discharge port from the first zone to a second zone, and (3) steam distilling in said second steam distillation zone at a rate lower than the rate in the first steam distillation and from about 0.01 to 0.017 pound of steam per minute per pound of lead metal and continuing said second steam distillation until the tetraethyllead thereby distilled plus the tetraethyllead distilled in the first steam distillation is at least above 95 percent of the tetraethyllead originally present in the reaction mass.

5. The improved method of recovering a tetraethyllead from a plurality of batches of reaction mass, each reaction mass consisting essentially of subdivided lead metal, sodium chloride and tetraethyllead, comprising (1) distilling each of said masses in a plurality of first steam distillations, the steam rate in each of said first distillations being from 0.02 to 0.04 pound per minute per pound of lead metal, and each of said distillations being continued until from four-fifths to about nineteen-twentieths of the tetraethyllead originally in the individual reaction mass is distilled, (2) combining the residue from each of the distillations of (1) in a second common steam distillation zone and steam distilling therein at a steam rate lower than in the first steam distillations and of 0.01 to 0.017 pound of steam per pound of lead metal and continuing said second steam distillation until the tetraethyllead thereby distilled plus the tetraethyllead distilled in the first steam distillations (1) is at least above 95 percent of the tetraethyllead originally present in the plurality of batches of reaction mass.

References Cited in the file of this patent

UNITED STATES PATENTS

| | | |
|---|---|---|
| 2,535,190 | Calingaert et al. | Dec. 26, 1950 |
| 2,661,361 | Grandjean | Dec. 1, 1953 |
| 2,777,867 | Giraitis et al. | Jan. 15, 1957 |
| 2,971,967 | Anderson | Feb. 14, 1961 |